(12) United States Patent
Willis et al.

(10) Patent No.: US 11,790,043 B2
(45) Date of Patent: Oct. 17, 2023

(54) SYSTEM AND METHOD FOR CONFIGURING A CLASSIFIER TO ACHIEVE A TARGET ERROR RATE

(71) Applicant: BlackBerry Limited, Waterloo (CA)

(72) Inventors: Edward Snow Willis, Ottawa (CA); Steven John Henkel, Waterloo (CA)

(73) Assignee: BlackBerry Limited, Waterloo (CA)

( * ) Notice: Subject to any disclaimer, the term of this patent is extended or adjusted under 35 U.S.C. 154(b) by 745 days.

(21) Appl. No.: 16/931,810

(22) Filed: Jul. 17, 2020

(65) Prior Publication Data
US 2022/0019859 A1 Jan. 20, 2022

(51) Int. Cl.
| | |
|---|---|
| *G06F 18/21* | (2023.01) |
| *G06F 1/03* | (2006.01) |
| *G06N 3/084* | (2023.01) |
| *G06F 18/24* | (2023.01) |
| *G06N 3/048* | (2023.01) |
| *G06N 20/00* | (2019.01) |

(52) U.S. Cl.
CPC ............ *G06F 18/2178* (2023.01); *G06F 1/03* (2013.01); *G06F 18/24* (2023.01); *G06N 3/048* (2023.01); *G06N 3/084* (2013.01); *G06N 20/00* (2019.01)

(58) Field of Classification Search
CPC ........ G06N 20/00; G06N 20/10; G06N 20/20; G06N 3/04; G06N 3/0455; G06N 3/047; G06N 3/08; G06N 3/084; G06N 3/091; G06N 3/092; G06F 1/03; G06F 18/2178; G06F 18/24
See application file for complete search history.

(56) References Cited

U.S. PATENT DOCUMENTS

| | | |
|---|---|---|
| 7,502,767 B1 | 3/2009 | Forman et al. |
| 2017/0032247 A1 | 2/2017 | Tadesse et al. |
| 2022/0413982 A1* | 12/2022 | Roy ...................... G06N 20/00 |

OTHER PUBLICATIONS

European Search Report dated Nov. 19, 2021; Application No. 21178482.2.
Gazagnaire J et al: "Environmentally-Adaptive Automated Target Recognition Algorithm Using parametric Characterization of Seabed Textures" Oceans 2010, IEEE, Piscataway, NJ, USA Sep. 20, 2010 (Sep. 20, 2010).
European Office Action dated Aug. 9, 2023; Application No. 21178482.2.

* cited by examiner

*Primary Examiner* — Shane D Woolwine
(74) *Attorney, Agent, or Firm* — Rowand LLP (57) ABSTRACT

A computer-implemented method comprises training, using a validation set of input, a first classifier to predict when a second classifier will issue a classification error on a particular input, the first classifier generating a number of data buckets based on the validation set of input and populating a threshold lookup table for each data bucket based on a number of thresholds set for the second classifier during the training; storing each threshold lookup table in memory; obtaining a target error rate; obtaining a new input and running the new input through the first classifier, the first classifier selecting one of the data buckets for the new input; and selecting a threshold for the second classifier using the stored threshold lookup table for the selected data bucket and the target error rate.

20 Claims, 5 Drawing Sheets

| Bucket *n* | |
|---|---|
| Threshold | Error Rate |
| 0.50 | 0.050 |
| 0.60 | 0.045 |
| 0.70 | 0.040 |
| . | |
| . | |
| . | |
| 0.99 | 0.005 |
| 1.00 | 0.000 |

FIG. 4

| Policy Level | Error Rate |
|---:|---:|
| 1 | 0.050 |
| 2 | 0.040 |
| 3 | 0.030 |
| 4 | 0.020 |
| 5 | 0.010 |

FIG. 5

SYSTEM AND METHOD FOR CONFIGURING A CLASSIFIER TO ACHIEVE A TARGET ERROR RATE

TECHNICAL FIELD

The present disclosure relates to classifiers and, more particularly, to systems and methods for configuring a classifier to achieve a target error rate.

BACKGROUND

Classification is the process of predicting the class of an input. Machine learning based classifiers are trained machine learning models which solve a supervised problem where inputs are mapped to a constrained set of outputs. Machine learning based classifiers are trained using a large number of example cases which map inputs to expected outputs.

Machine learning based classifiers are often evaluated during training solely on their accuracy, that is, their ability to predict the correct classification for an input. These classifiers are often trained to be as accurate as possible.

There are other factors of a machine learning based classifier that are important to a user in addition to accuracy.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Accordingly, in one aspect there is provided a computer-implemented method comprising training, using a validation set of input, a first classifier to predict when a second classifier will issue a classification error on a particular input, the first classifier generating a number of data buckets based on the validation set of input and populating a threshold lookup table for each data bucket based on a number of thresholds set for the second classifier during the training; storing each threshold lookup table in memory; obtaining a target error rate; obtaining a new input and running the new input through the first classifier, the first classifier selecting one of the data buckets for the new input; and selecting a threshold for the second classifier using the stored threshold lookup table for the selected data bucket and the target error rate.

In one or more embodiments, the first classifier runs each input of the validation set of the input through the second classifier at different thresholds to determine when the second classifier issues the classification error.

In one or more embodiments, the different thresholds are incremented by a predefined value.

In one or more embodiments, the classification error is one of a false positive and a false negative.

In one or more embodiments, the number of data buckets is $2^k$ data buckets, where k is a number of nodes in a chokepoint layer in the first classifier.

In one or more embodiments, obtaining the target error rate comprises providing the user with a plurality of error rates for selection as the target error rate; and receiving a user selection of the target error rate.

In one or more embodiments, obtaining the target error rate comprises providing the user with a plurality of policy levels, each policy level associated with a particular error rate; and receiving a user selection of one of the policy levels.

In one or more embodiments, the target error rate is one of a false positive rate or a false negative rate.

In one or more embodiments, the method further comprises setting the threshold for the second classifier; and running the new input through the second classifier to classify the new input.

According to another aspect there is provided a system comprising at least one processor; and a memory coupled to the at least one processor and storing instructions that, when executed by the at least one processor, configure the at least one processor to train, using a validation set of input, a first classifier to predict when a second classifier will issue a classification error on a particular input, the first classifier generating a number of data buckets based on the validation set of input and populating a threshold lookup table for each data bucket based on a number of thresholds set for the second classifier during the training; store each threshold lookup table in memory; obtain a target error rate; obtain a new input and run the new input through the first classifier, the first classifier selecting one of the data buckets for the new input; and select a threshold for the second classifier using the stored threshold lookup table for the selected data bucket and the target error rate.

In one or more embodiments, the first classifier runs each input of the validation set of the input through the second classifier at different thresholds to determine when the second classifier issues the classification error.

In one or more embodiments, the different thresholds are incremented by a predefined value.

In one or more embodiments, the classification error is one of a false positive and a false negative.

In one or more embodiments, the number of data buckets is $2^k$ data buckets, where k is a number of nodes in a chokepoint layer in the first classifier.

In one or more embodiments, obtaining the target error rate comprises providing the user with a plurality of error rates for selection as the target error rate; and receiving a user selection of the target error rate.

In one or more embodiments, obtaining the target error rate comprises providing the user with a plurality of policy levels, each policy level associated with a particular error rate; and receiving a user selection of one of the policy levels.

In one or more embodiments, the target error rate is one of a false positive rate or a false negative rate.

In one or more embodiments, the instructions, when executed by the at least one processor, configure the at least one processor to set the threshold for the second classifier; and run the new input through the second classifier to classify the new input.

According to another aspect, there is provided a non-transitory computer readable storage medium comprising computer-executable instructions which, when executed, configure a processor to train, using a validation set of input, a first classifier to predict when a second classifier will issue a classification error on a particular input, the first classifier generating a number of data buckets based on the validation set of input and populating a threshold lookup table for each data bucket based on a number of thresholds set for the second classifier during the training; store each threshold lookup table in memory; obtain a target error rate; obtain a new input and run the new input through the first classifier, the first classifier selecting one of the data buckets for the new input; and select a threshold for the second classifier using the stored threshold lookup table for the selected data bucket and the target error rate.

In one or more embodiments, the target error rate is one of a false positive rate or a false negative rate.

Advantageously, in this way, a user may select a target error rate for the second classifier as needed. For example, it may be advantageous to the user that the second classifier generate a higher false positive or a higher false negative rate when analyzing an input.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
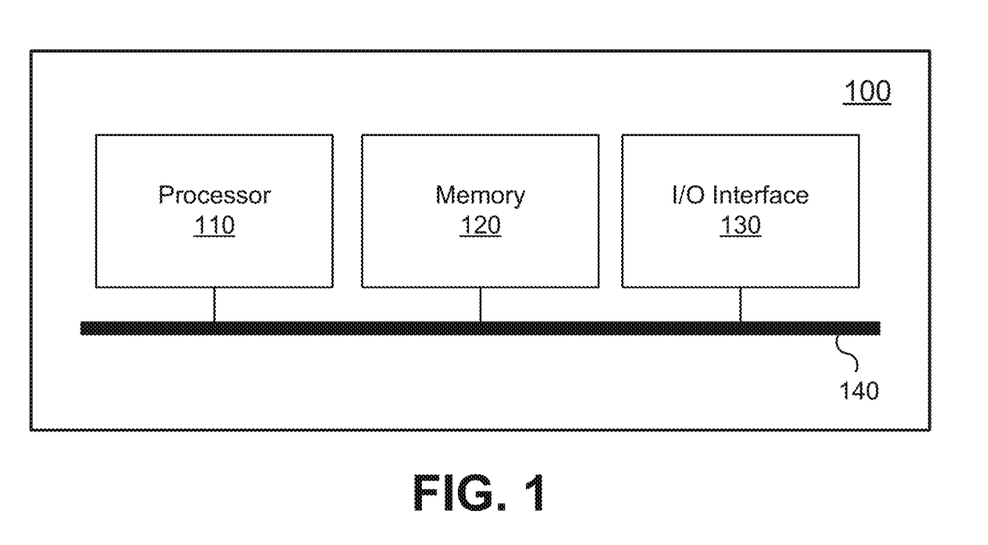
FIG. 1 shows a high-level block diagram of an example computing device.

FIG. 1 shows a high-level block diagram of an example computer system. In this example, the computing system comprises an example computing device 100. As illustrated, the example computing device 100 includes a processor 110, a memory 120, and an I/O interface 130. The foregoing modules of the example computing device 100 are in communication over and communicatively coupled to one another by a bus 140.

The processor 110 includes a hardware processor and may, for example, include one or more processors using ARM, x86, MIPS, or PowerPC™ instruction sets. For example, the processor 110 may include Intel™ Core™ processors, Qualcomm™ Snapdragon™ processors, or the like.

The memory 120 comprises a physical memory. The memory 120 may include random access memory, read-only memory, persistent storage such as, for example, flash memory, a solid-state drive or the like. Read-only memory and persistent storage are a computer-readable medium and, more particularly, may each be considered a non-transitory computer-readable storage medium. A computer-readable medium may be organized using a file system such as may be administered by software governing overall operation of the example computing device 100.

The I/O interface 130 is an input/output interface. The I/O interface 130 allows the example computing device 100 to receive input and provide output. For example, the I/O interface 130 may allow the example computing device 100 to receive input from or provide output to a user. In another example, the I/O interface 130 may allow the example computing device 100 to communicate with a computer network. The I/O interface 130 may serve to interconnect the example computing device 100 with one or more I/O devices such as, for example, a keyboard, a display screen, a pointing device like a mouse or a trackball, a fingerprint reader, a communications module, a hardware security module (HSM) (e.g., a trusted platform module (TPM)), or the like. Virtual counterparts of the I/O interface 130 and/or devices accessed via the I/O interface 130 may be provided such as, for example, by a host operating system.

Software comprising instructions is executed by the processor 110 from a computer-readable medium. For example, software corresponding to a host operating system may be loaded into random-access memory from persistent storage or flash memory of the memory 120. Additionally or alternatively, software may be executed by the processor 110 directly from read-only memory of the memory 120.

In another example, software may be accessed via the I/O interface 130.

The computing device 100 may be configured to train a first classifier to predict when a second classifier will issue a classification error on a particular input. As will be described in more detail below, the trained first classifier has a narrow layer at one point in its architecture. The narrow layer has a size of k bit values. The narrow layer may be referred to as a chokepoint layer.

The second classifier may be for example a conventional classifier and may classify an input based on a threshold. The threshold may be for example 0.5. The second classifier may generate a positive result when the output of the second classifier is above the threshold and may generate a negative result when the output of the second classifier is below the threshold. Of course, the second classifier may incorrectly classify an input and this error may be referred to as a classification error.

For the second classifier, a classification error may be a false positive or a false negative. Table 1 shows classification predictions that may be generated by the second classifier:

TABLE 1

Classification Predictions for the Second Classifier

| | | Second Classifier Prediction | |
| --- | --- | --- | --- |
| | | X | Y |
| Actual Decision | X | True Positive | False Negative |
| | Y | False Positive | True Negative |

As can be seen, a true positive is an outcome where the second classifier correctly predicts the particular input as being positive. A true negative is an outcome where the second classifier correctly predicts the particular input as being negative. A false positive is an outcome where the second classifier incorrectly predicts the particular input as being positive. A false negative is an outcome where the second classifier incorrectly predicts the particular input as being negative.

A false positive rate or a false negative rate may be calculated. For example, a false positive rate (FPR) may be calculate using equation 1:

$$FPR = \frac{FP}{(FP+TN)}, \qquad (1)$$

where FP is the number of false positives generated by the second classifier, and TN is the total number of true negatives generated by the second classifier. The false positive rate is the probability that a positive result will be given on a particular input when the true value of the particular input is negative.

A false negative rate may be calculated in a similar manner to that shown in equation 1. The false negative rate is the probability that a negative result will be given on a particular input when the true value of the particular input is positive.

The threshold may be adjusted to be higher or lower. A higher threshold results in the second classifier generating fewer false positives. However, a higher threshold also results in the second classifier generating fewer true positives. Similarly, a lower threshold results in the second classifier generating fewer false negatives. However, a lower threshold also results in the second classifier generating fewer true negatives.

As will be described in more detail below, using the trained first classifier, the computing device 100 is able to provide selectable options to a user to tailor an error rate, specifically a false positive rate or a false negative rate, of the second classifier.

Figure 2:
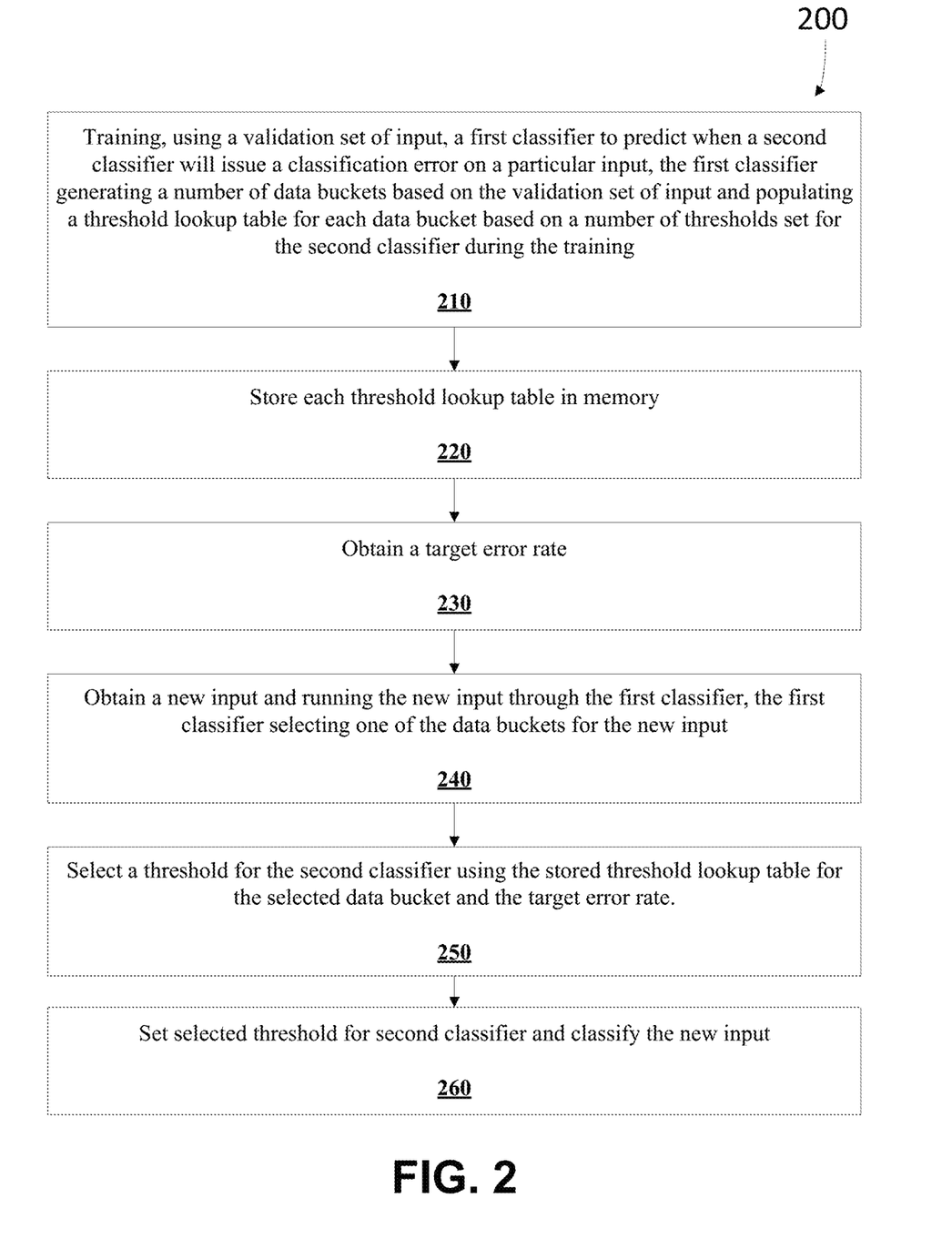
FIG. 2 provides a flow chart illustrating a method for configuring a classifier to achieve a target error rate.

FIG. 2 is a flowchart showing operations performed by the computing device 100 according to an embodiment. The operations may be included in a method 200 which may be performed by the computing device 100. For example, computer-executable instructions stored in memory of the computing device 100 may, when executed by the processor 110 of the computing device 100, configure the computing device 100 to perform the method 200 or a portion thereof.

The method 200 begins with training, using a validation set of input, a first classifier to predict when a second classifier will issue a classification error on a particular input (step 200). The first classifier generates a number of data buckets based on the validation set of input and populates a threshold lookup table for each data bucket based on a number of thresholds set for the second classifier during the training.

Figure 3:
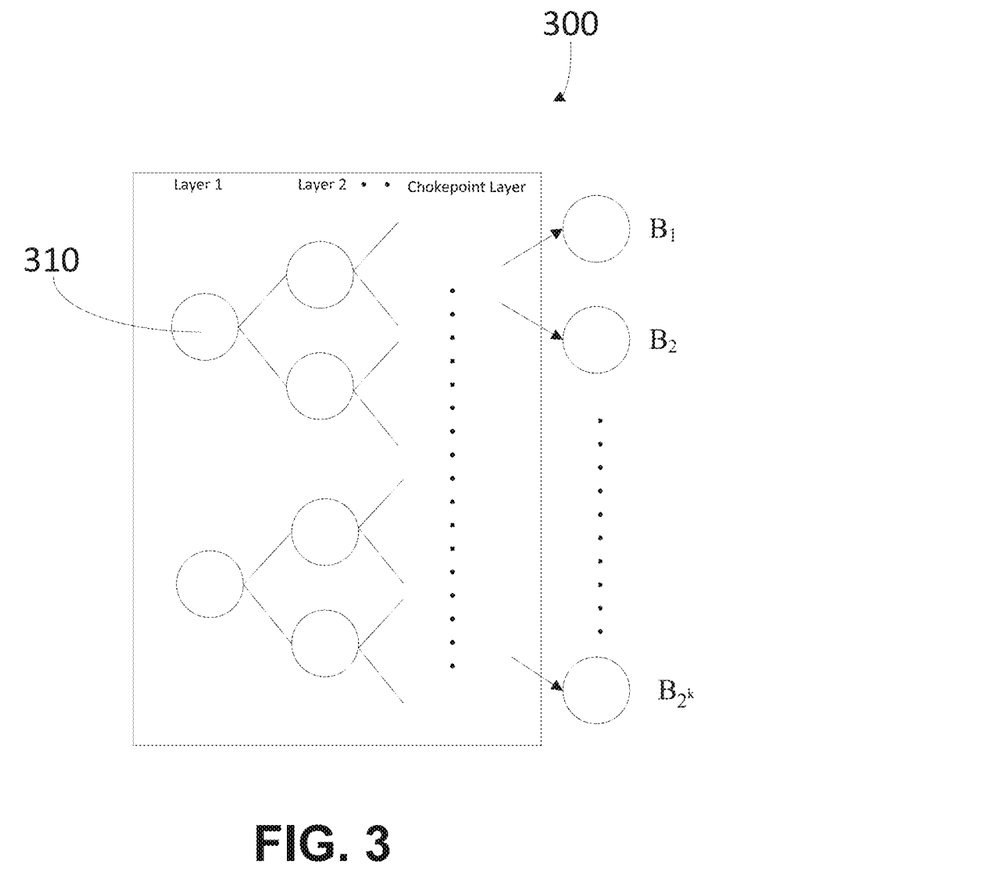
FIG. 3 provides a diagram of a first classifier.

In this embodiment, the first classifier is a deep neural network classifier as shown in FIG. 3 and identified by reference numeral 300. The first classifier 300 includes a number of layers, each of which includes nodes 310. The first classifier 300 is truncated in that it comprises a chokepoint layer that is k nodes wide, where k is a small number. Put another way, compared to a conventional neural network classifier that includes m layers (or, put another way, a classifier that has an output layer m), the first classifier 300 comprises a chokepoint layer. All layers after the chokepoint layer are removed, that is, the layers after the chokepoint layer to the output layer m are removed. The chokepoint layer is k nodes wide and has k binary values. As such, the first classifier 300 generates $2^k$ data buckets. In FIG. 3, the data buckets are identified using $B_1, B_2 \ldots B_{2^k}$.

The chokepoint layer may be selected prior to the execution of method 200 and may be for example 2 nodes wide, 3 nodes wide . . . 5 nodes wide, etc. In the example where the chokepoint layer is 5 nodes wide, the first classifier generates $2^5=32$ buckets.

In this embodiment, the second classifier is a conventional deep neural network classifier that includes m layers.

The validation set of input, which may include a training dataset, is a set of data that has known outcomes or classifications.

As mentioned, the first classifier predicts when the second classifier will issue a classification error on a particular input. In this embodiment, the first classifier runs each input of the validation set through the second classifier to determine when the second classifier issues the classification error. Each input is run through the second classifier at a plurality of thresholds. For example, an input is run through the second classifier having a threshold set at, for example, 0.5, and is again run through the second classifier, this time having a threshold set at, for example, 0.6.

Figure 4:
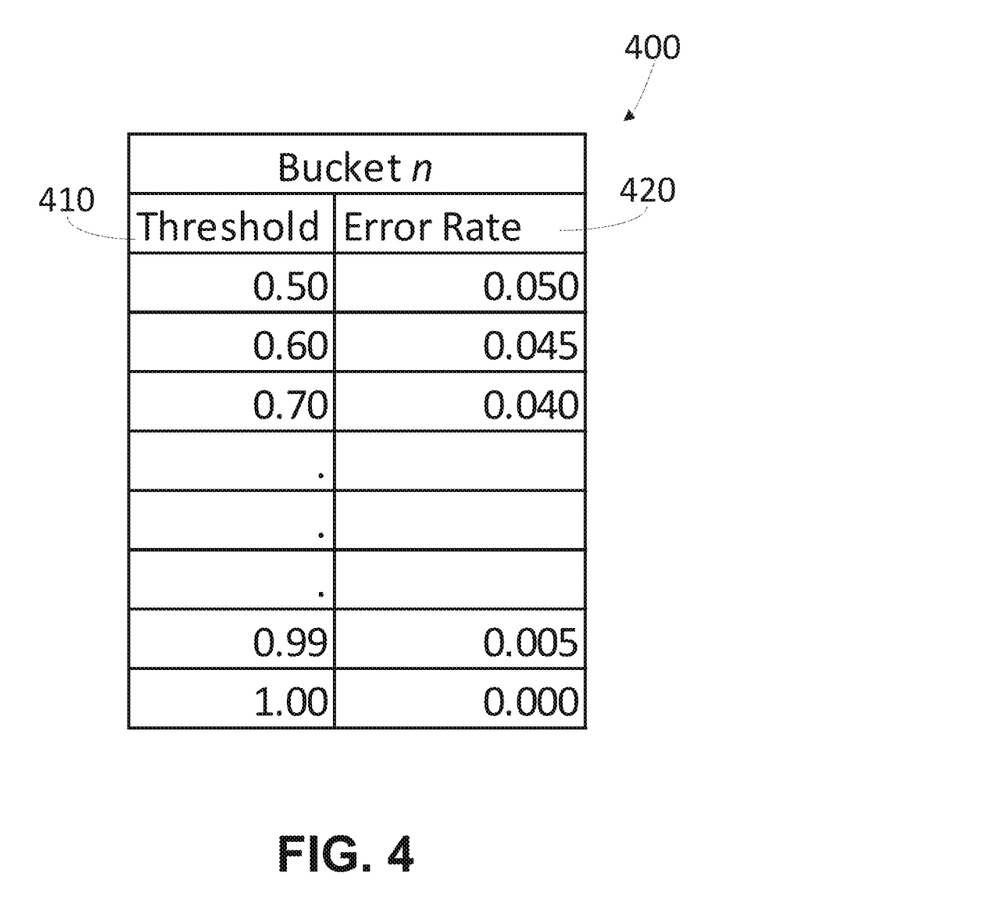
FIG. 4 provides a lookup table for a data bucket n listing various thresholds and corresponding error rates.

The first classifier populates a threshold lookup table for each data bucket $B_1, B_2 \ldots B_{2^k}$. An example threshold lookup table 400 is shown in FIG. 4. As can be seen, the threshold lookup table 400 includes a column listing a plurality of thresholds 410 and a corresponding error rate 420. Each error rate is the error rate generated by the second classifier using the corresponding threshold. The error rate may be one of a false positive rate or a false negative rate.

As shown in FIG. 4, for data bucket n, when the threshold was set as 0.5, the second classifier generated an error rate of 0.050. Where the error rate is a false positive rate, this means that the second classifier will generate a false positive rate of 0.050. The second classifier correctly classifies input at a rate of 1−0.050=0.95, or 95% of the time. Put another way, there is a 5% chance that the second classifier will generate a false positive error for a given input when the threshold is set as 0.5 for any data that is determined to be in data bucket n.

Although the thresholds shown in FIG. 4 include 0.5, 0.6, 0.7 . . . 0.99, 1.00, these thresholds are selected merely for illustrative purposes. It will be appreciated that the plurality of thresholds may be, for example, 1000 thresholds, where each threshold is incremented by a predefined value such as for example 0.01 or 0.001. As such, each lookup table may include 1000 sets of thresholds and corresponding error rates.

Each threshold lookup table is stored in memory (step 220). In this embodiment, each threshold lookup table is stored in memory 120 of the computing device 100. As will be appreciated, each threshold table may additionally or alternatively be stored in cloud storage, for example.

Figure 5:
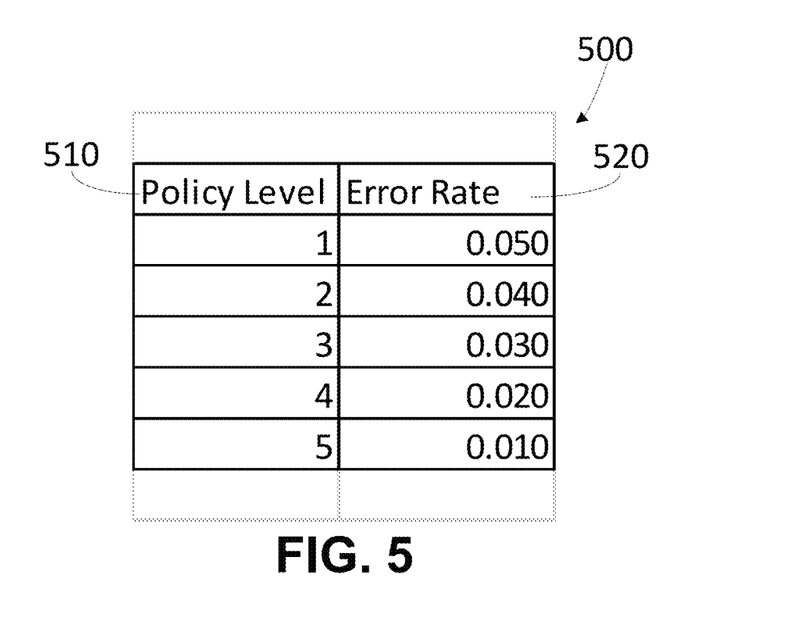
FIG. 5 provides a policy level table listing various policy levels and corresponding error rates.

A target error rate is obtained (step 230). In this embodiment, the target error rate is obtained from the user by providing the user with a number of policy levels, each of which has a corresponding error rate. An example policy level table 500 is shown in FIG. 5. As can be seen, the policy level table includes a policy level column 510 and a corresponding error rate 520. In the example shown in FIG. 5, the policy level column 510 lists five (5) options that can be selected by the user. The policy levels are 1, 2, 3, 4, 5 having corresponding error rates of 0.050, 0.040, 0.030, 0.020 and 0.010. The user may be prompted to select one of the policy levels through, for example, a graphical user interface (GUI) displayed on a display screen of the computing device 100. When the user selects a policy level, the corresponding error rate is obtained as the target error rate.

It will be appreciated that in another embodiment, rather than policy levels, the user may be provided with a plurality of error rates for selection as the target rate. In this embodiment, the target error rate is obtained based on a user selection of one of the error rates.

In another embodiment, a user can provide a target error rate. In this embodiment, if the provided target error rate does not match one of the error rates in the lookup table, the first classifier may be further trained until the lookup table includes the provided target error rate. The further training may be completed using more specific thresholds. For example, training may be completed using thresholds of 0.5, 0.6, etc. and the further training may be completed using thresholds of 0.50, 0.51, 0.52, etc. In another embodiment, if the provided target error rate does not match one of the error rates in the lookup table, the closest error rate to the target error rate may be selected.

It will be appreciated that in another embodiment, rather than policy levels, the user may be provided with a plurality of accuracy rates for selection and the target error rate may be calculated from the selected accuracy rate. For example, the user may select 95% as the accuracy rate and the target error rate may be calculated as 1−0.95=0.05 (or 5%) as the target error rate.

The user may be prompted to select the target error rate as a false positive rate or a false negative rate and the target error rate may be obtained accordingly.

A new input is obtained and is run through the first classifier, the first classifier selecting one of the data buckets for the new input (step 240). The new input is an input that is to be classified using the second classifier based on the target error rate. The new input is run through the first classifier. Put another way, the new input is entered as input to the first classifier. The first classifier analyzes the new input and selects one of the data buckets $B_1, B_2 \ldots B_k$ for the new input.

A threshold is selected for the second classifier using the stored lookup table for the selected data bucket and the target error rate (step 250). Once a data bucket has been selected for the new input, the target error rate is used to determine what threshold should be set for the second classifier to classify the new input at the target error rate.

Once a threshold has been selected for the second classifier, the threshold is set for the second classifier and the new input is run through the second classifier for classification (step 260). As such, the second classifier is configured to achieve the target error rate.

Although in embodiments the first and second classifiers are described as being deep neural network classifiers, those skilled in the art will appreciate that at least one of the first and second classifiers may be another type of neural network classifier.

It will be appreciated that it may be that some or all of the above-described operations of the various above-described example methods may be performed in orders other than those illustrated and/or may be performed concurrently without varying the overall operation of those methods.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method comprising:
    training, using a validation set of input, a first classifier to predict when a second classifier will issue a classification error on a particular input, the first classifier generating a number of data buckets based on the validation set of input and populating a threshold lookup table for each data bucket based on a number of thresholds set for the second classifier during the training;
    storing each threshold lookup table in memory;
    obtaining a target error rate;
    obtaining a new input and running the new input through the first classifier, the first classifier selecting one of the data buckets for the new input; and
    selecting a threshold for the second classifier using the stored threshold lookup table for the selected data bucket and the target error rate.

2. The method of claim 1, wherein the first classifier runs each input of the validation set of the input through the second classifier at different thresholds to determine when the second classifier issues the classification error.

3. The method of claim 2, wherein the different thresholds are incremented by a predefined value.

4. The method of claim 1, wherein the classification error is one of a false positive and a false negative.

5. The method of claim 1, wherein the number of data buckets is $2^k$ data buckets, where k is a number of nodes in a chokepoint layer in the first classifier.

6. The method of claim 1, wherein obtaining the target error rate comprises:
    providing the user with a plurality of error rates for selection as the target error rate; and
    receiving a user selection of the target error rate.

7. The method of claim 1, wherein obtaining the target error rate comprises:
    providing the user with a plurality of policy levels, each policy level associated with a particular error rate; and
    receiving a user selection of one of the policy levels.

8. The method of claim 1, wherein the target error rate is one of a false positive rate or a false negative rate.

9. The method of claim 1, further comprising:
    setting the threshold for the second classifier; and
    running the new input through the second classifier to classify the new input.

10. A system comprising:
    at least one processor; and
    a memory coupled to the at least one processor and storing instructions that, when executed by the at least one processor, configure the at least one processor to:
        train, using a validation set of input, a first classifier to predict when a second classifier will issue a classification error on a particular input, the first classifier generating a number of data buckets based on the validation set of input and populating a threshold lookup table for each data bucket based on a number of thresholds set for the second classifier during the training;
        store each threshold lookup table in memory;
        obtain a target error rate;
        obtain a new input and run the new input through the first classifier, the first classifier selecting one of the data buckets for the new input; and
        select a threshold for the second classifier using the stored threshold lookup table for the selected data bucket and the target error rate.

11. The system of claim 10, wherein the first classifier runs each input of the validation set of the input through the second classifier at different thresholds to determine when the second classifier issues the classification error.

12. The system of claim 11, wherein the different thresholds are incremented by a predefined value.

13. The system of claim 10, wherein the classification error is one of a false positive and a false negative.

14. The system of claim 10, wherein the number of data buckets is $2^k$ data buckets, where k is a number of nodes in a chokepoint layer in the first classifier.

15. The system of claim 10, wherein obtaining the target error rate comprises:
providing the user with a plurality of error rates for selection as the target error rate; and
receiving a user selection of the target error rate.

16. The system of claim 10, wherein obtaining the target error rate comprises:
providing the user with a plurality of policy levels, each policy level associated with a particular error rate; and
receiving a user selection of one of the policy levels.

17. The system of claim 10, wherein the target error rate is one of a false positive rate or a false negative rate.

18. The system of claim 10, wherein the instructions, when executed by the at least one processor, configure the at least one processor to:
set the threshold for the second classifier; and
run the new input through the second classifier to classify the new input.

19. A non-transitory computer readable storage medium comprising computer-executable instructions which, when executed, configure a processor to:
train, using a validation set of input, a first classifier to predict when a second classifier will issue a classification error on a particular input, the first classifier generating a number of data buckets based on the validation set of input and populating a threshold lookup table for each data bucket based on a number of thresholds set for the second classifier during the training;
store each threshold lookup table in memory;
obtain a target error rate;
obtain a new input and run the new input through the first classifier, the first classifier selecting one of the data buckets for the new input; and
select a threshold for the second classifier using the stored threshold lookup table for the selected data bucket and the target error rate.

20. The non-transitory computer readable storage medium of claim 19, wherein the target error rate is one of a false positive rate or a false negative rate.

* * * * *